United States Patent
Ogami et al.

(10) Patent No.: US 7,661,331 B2
(45) Date of Patent: Feb. 16, 2010

(54) SHIFTING DEVICE FOR DUAL CLUTCH TRANSMISSION

(75) Inventors: Shiro Ogami, Kariya (JP); Norio Kayukawa, Nishio (JP)

(73) Assignee: Aisin AI Co., Ltd., Nishio-Shi, Aichi-Ken (JP)

( * ) Notice: Subject to any disclaimer, the term of this patent is extended or adjusted under 35 U.S.C. 154(b) by 460 days.

(21) Appl. No.: 11/785,041

(22) Filed: Apr. 13, 2007

(65) Prior Publication Data
US 2007/0240530 A1 Oct. 18, 2007

(30) Foreign Application Priority Data
Apr. 13, 2006 (JP) .............................. 2006-111231

(51) Int. Cl.
*F16H 63/18* (2006.01)
(52) U.S. Cl. ..................................... 74/337.5
(58) Field of Classification Search ........................ None
See application file for complete search history.

(56) References Cited

U.S. PATENT DOCUMENTS

2005/0211007 A1* 9/2005 Suzuki et al. ................. 74/340

FOREIGN PATENT DOCUMENTS

| JP | 57154548 A | * | 9/1982 |
| JP | 60146942 A | * | 8/1985 |
| JP | 64-46064 A | | 2/1989 |
| JP | 2006-2789 A | | 1/2006 |

* cited by examiner

*Primary Examiner*—Sherry L Estremsky
*Assistant Examiner*—Erin D Bishop
(74) *Attorney, Agent, or Firm*—Buchanan Ingersoll & Rooney PC

(57) ABSTRACT

A shifting device for a dual clutch transmission, the dual clutch transmission including a first input shaft, a second input shaft, a counter shaft, a dual clutch, a first gear change mechanism including at least a first gear train and a first switching clutch, and a second gear change mechanism including at least a second gear train and a second switching clutch, the shifting device including a shift mechanism constituted by a first shifter that includes a first follower pin and a first shift fork, a second shifter that includes a second follower pin and a second shift fork, and a cam member at which a single cam groove is formed, and the first and second follower pins engaging with different positions on the cam groove from each other and operating the first and second switching clutches to be associated with each other.

7 Claims, 8 Drawing Sheets

FIG. 4

| | Dual clutch 12 | | 1st switching clutch 30A | | | 2nd switching clutch 30B | | | 3rd switching clutch 30C | | | 4th switching clutch 30D | | |
|---|---|---|---|---|---|---|---|---|---|---|---|---|---|---|
| | C1 | C2 | S1 | N | S3 | S2 | N | S4 | S5 | N | S7 | S6 | N | SR |
| 1st | ○ | | ○ | | | | | | | | | | ○ | |
| 2nd | | ○ | | ○ | | ○ | | | | ○ | | | ○ | |
| 3rd | ○ | | | ○ | | | ○ | | | ○ | | | ○ | |
| 4th | | ○ | | ○ | ○ | | | ○ | | ○ | | | ○ | |
| 5th | ○ | | | ○ | | | ○ | | ○ | | | | ○ | |
| 6th | | ○ | | ○ | | | ○ | | | ○ | | ○ | | |
| 7th | ○ | | | ○ | | | ○ | | | | ○ | | ○ | |
| Reverse | ○ | | | ○ | | | ○ | | | ○ | | | | ○ |

SHIFTING DEVICE FOR DUAL CLUTCH TRANSMISSION

CROSS REFERENCE TO RELATED APPLICATIONS

This application is based on and claims priority under 35 U.S.C. §119 to Japanese Patent Application No. 2006-111231, filed on Apr. 13, 2006, the entire content of which is incorporated herein by reference.

FIELD OF THE INVENTION

This invention generally relates to a shifting device for a dual clutch transmission.

BACKGROUND

An automatic transmission for a vehicle provided with a fluid-type torque converter has been widely known. However, such fluid-type torque converter may suffer from slippages when transmitting power, leading to a loss of transmission efficiency. In light of the foregoing, automation of a transmission apparatus that includes a gear-type manual transmission has been suggested. For example, as disclosed in JP64-46046A (Reference 1, 10th line from the lower left in page 2 to 17th line from the upper left in page 3, FIGS. 1 to 7), a portion of each shift fork engages with each cam groove formed at an outer periphery of a cylindrical cam so that a shift operation can be performed by a rotation of the cylindrical cam. In addition, as disclosed in JP2006-002789A (Reference 2, paragraphs 3 to 9, FIG. 8), a dual clutch transmission is equipped with an automatic clutch mechanism of two frictional clutches that are brought to an engagement state and a disengagement state in turns, i.e., a dual clutch mechanism.

According to a cylindrical cam-type automatic operating mechanism of the transmission disclosed in Reference 1, multiple cam grooves are formed at the outer periphery of the cylindrical cam that is driven to rotate by a motor. The portion (i.e., shift lever) of each shift fork by means of which gears of the transmission are shifted engages with each cam groove so that the shift fork performs a reciprocating movement. When the cylindrical cam is driven to rotate by the motor, the shift operation is performed in such a way that, while one of the shift forks is being driven, the remaining shift forks that are not being driven are operated in association with one another and stopped in neutral positions. According to the disclosed transmission, multiple actuator functions can be achieved by a single cylindrical cam and thus only one motor is required, which leads to a downsized and light-weighted transmission.

According to the dual clutch transmission disclosed in Reference 2, an input, which is transmitted from a drive shaft such as an output shaft of an engine, is first transmitted to a first input shaft via a first frictional clutch of the dual clutch mechanism, and then is transmitted to a second input shaft of a hollow shape. The second input shaft is arranged at a peripheral portion of the first input shaft so as to be coaxial with the first input shaft. As being explained in FIG. 5, the first and second frictional clutches of the dual clutch mechanism are controlled in a manner that, during a shift operation, when a transfer torque A increases, a transfer torque B decreases in contrast with the transfer torque A, and vice versa. After the shift operation, the torque transfer A reaches the maximum torque value T0 and the transfer torque B falls down to zero, and vice versa. This dual clutch transmission includes first and second counter shafts arranged in parallel with the first and second input shafts. Arranged between the first input shaft and the first and second counter shafts is a first gear change mechanism including four gear trains for a first shift stage, a third shift stage, a fifth shift stage, and a seventh shift stage, respectively. Arranged between the second input shaft and the first and second counter shafts is a second gear change mechanism including three gear trains for a second shift stage, a fourth shift stage, and a sixth shift stage. Further, arranged between the first input shaft and the second counter shaft is a gear train for a reverse shift stage. In the operation of the dual clutch transmission, a controller thereof controls the first frictional clutch and the second frictional clutch to be engaged or disengaged in turns. The operations of the first and second frictional clutches are responsive to a condition of a vehicle, such as an accelerator opening degree, an engine rotational speed (rpm), a speed of the vehicle, or the like. When the first frictional clutch is controlled to the engagement state, one of the 1st, 3rd, 5th, and 7th shift stages is selected and power transmission in accordance with the selected shift stage is implemented. On the other hand, when the second frictional clutch is controlled to the engagement state, one of the 2nd, 4th, 6th, and reverse shift stages is selected and power transmission in accordance with the selected shift stage is implemented.

In the cases where the cam-type automatic operating mechanism as disclosed in Reference 1 is applied to the dual clutch transmission mechanism as disclosed in Reference 2, the multiple actuator functions can be achieved by a single cylindrical cam so that the number of motors required can be reduced or only one motor can be required, which leads to a downsized and light-weighted transmission. FIGS. 10 and 11 each illustrate a structure in the vicinity of a shifting device of such dual clutch transmission as a comparison example. This dual clutch transmission of the comparison example includes a first gear change mechanism 20A constituted by two gear trains each of which consists of a driving gear and a driven gear (in FIG. 11, only driven gears 21b and 23b are illustrated) arranged between a first input shaft (not shown) and a counter shaft 15, and a first switching clutch 30A provided at the counter shaft 15 so as to select the power transmission between the first input shaft and the counter shaft 15 conducted by the aforementioned gear trains. The dual clutch transmission also includes a second gear change mechanism 20B constituted by two gear trains each of which consists of a driving gear and a driven gear (in FIG. 11, only the driven gears 22b and 24b are illustrated) arranged between a second input shaft (not shown) and the counter shaft 15, and a second switching clutch 30B provided at the counter shaft 15 so as to select the power transmission between the second input shaft and the counter shaft 15 conducted by the aforementioned gear trains. A shift mechanism 1A includes first and second shifters 2A and 2B, and a cylindrical cam 5A. The first and second shifters 2A and 2B include body portions 2a and 2d, respectively, which are axially slidably guided and supported by a guide bar 3A that is arranged in parallel with the counter shaft 15. The cylindrical cam 5A is arranged in parallel with the counter shaft 15 in a rotatable manner. A shift fork 2b and a follower pin 2c integrally formed with the body portion 2a of the first shifter 2A engage with a peripheral groove of a sleeve M provided at the first switching clutch 30A, and a cam groove 6A formed at an outer peripheral surface of the cylindrical cam 5A, respectively. In the same way, a shift fork 2e and a follower pin 2f integrally formed with the body portion 2d of the second shifter 2B engage with a peripheral groove of a sleeve M provided at the second switching clutch 30B, and the a cam groove 6B formed at the outer peripheral surface of the cylindrical cam 5A, respectively.

When the cylindrical cam 5A is driven to rotate by a shift motor (not shown) via a worm wheel 7A and a worm 8A, then the first and second shifters 2A and 2B of which respective follower pins 2c and 2f are engaging with the cam grooves 6A and 6B are driven to reciprocate along the guide bar 3A. In response to this reciprocating movement of the first and second shifters 2A and 2B, the shift forks 2b and 2e cause the respective sleeves M of the first and second switching clutches 30A and 30B to perform a reciprocating movement. Then, the first and second gear change mechanisms 20A and 20B are activated to thereby achieve a gear shift operation.

According to the aforementioned shift mechanism of the dual clutch transmission, the first and second shifters 2A and 2B are operated by the single cylindrical cam 5A. Thus, the downsized and light-weighted transmission can be achieved. However, a length of the cylindrical cam 5A is large because of the two cam grooves 6A and 6B formed and thus downsizing and weight reducing the shifting device may be insufficient.

Thus, a need exists for a shifting device for a dual clutch transmission having a dual clutch mechanism that can be further downsized and reduced in weight and that requires only a small operation force by means of a single cam groove formed at a cam member such as a cylindrical cam.

SUMMARY OF THE INVENTION

According to an aspect of the present invention, a shifting device for a dual clutch transmission is provided, wherein the dual clutch transmission includes a first input shaft, a second input shaft, and a counter shaft arranged in parallel with one another, a dual clutch including a first clutch for transmitting rotation of a drive shaft that is driven to rotate by a power source to the first input shaft and a second clutch for transmitting rotation of the drive shaft to the second input shaft, a first gear change mechanism including at least a first gear train provided between the first input shaft and the counter shaft and a first switching clutch for selecting a power transmission performed by the first gear train, and a second gear change mechanism including at least a second gear train provided between the second input shaft and the counter shaft and a second switching clutch for selecting a power transmission performed by the second gear train. The shifting device includes a shift mechanism operating the first and second switching clutches and including a first shifter that includes a first follower pin and a first shift fork engaging with a switching member provided at the first switching clutch. The first shifter is slidably arranged in parallel with the first input shaft and the counter shaft. The shift mechanism also includes a second shifter that includes a second follower pin and a second shift fork engaging with a switching member provided at the second switching clutch. The second shifter is slidably arranged in parallel with the second input shaft and the counter shaft. The shift mechanism further includes a cam member driven by a motor to rotate and at which a single cam groove is formed. The cam groove passes through a position away from a rotational center of the cam member. The first and second follower pins engage with different positions on the cam groove from each other and operating the first and second switching clutches to be associated with each other.

BRIEF DESCRIPTION OF THE DRAWINGS

The foregoing and additional features and characteristics of the present invention will become more apparent from the following detailed description considered with reference to the accompanying drawings, wherein:

FIG. 4 is a table explaining a shift operation according to the embodiment of the present invention;

DETAILED DESCRIPTION

Figure 1:
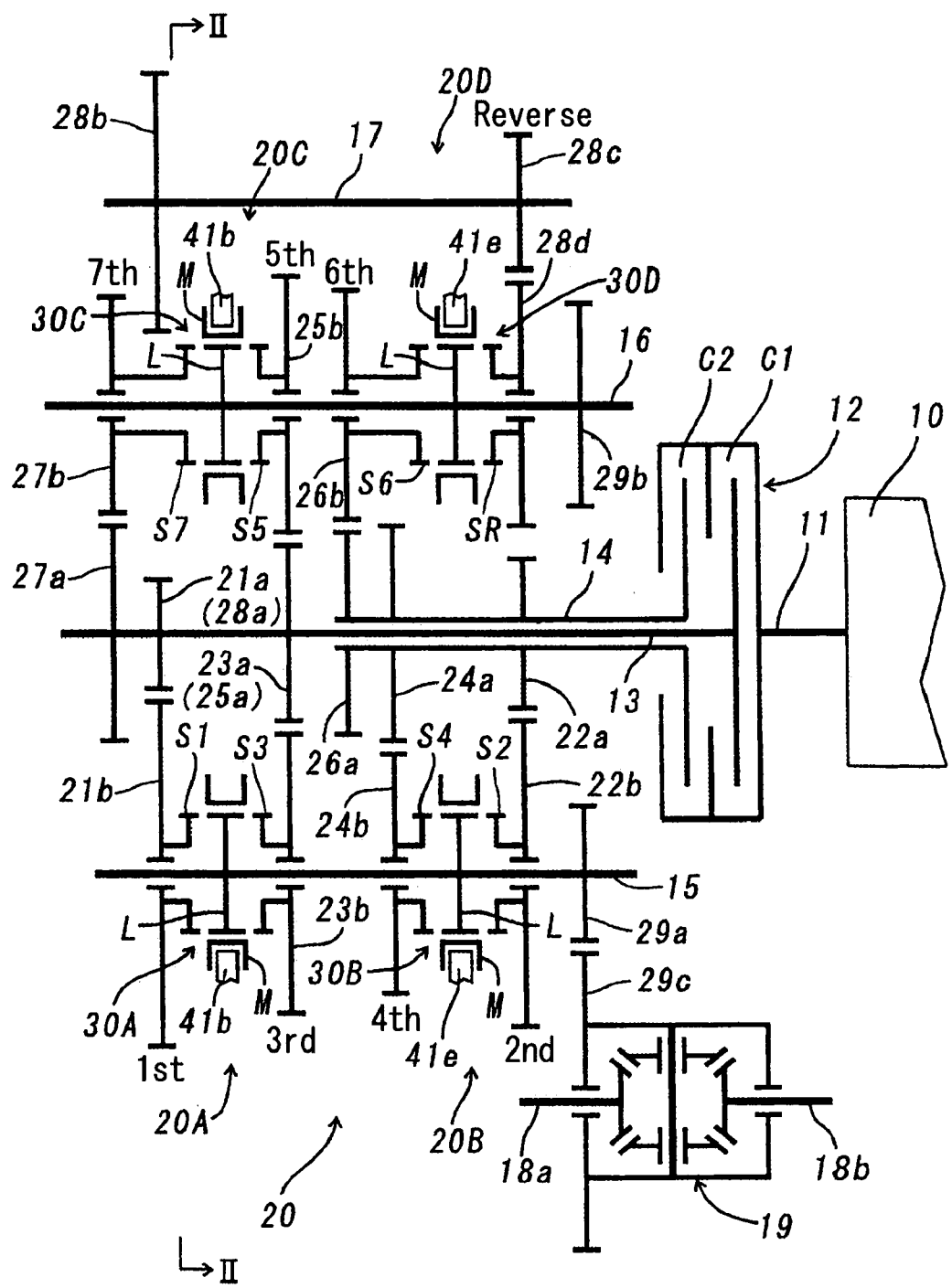
FIG. 1 is a view schematically illustrating an entire structure of a dual clutch transmission having a shifting device according to an embodiment of the present invention.
Figure 5:
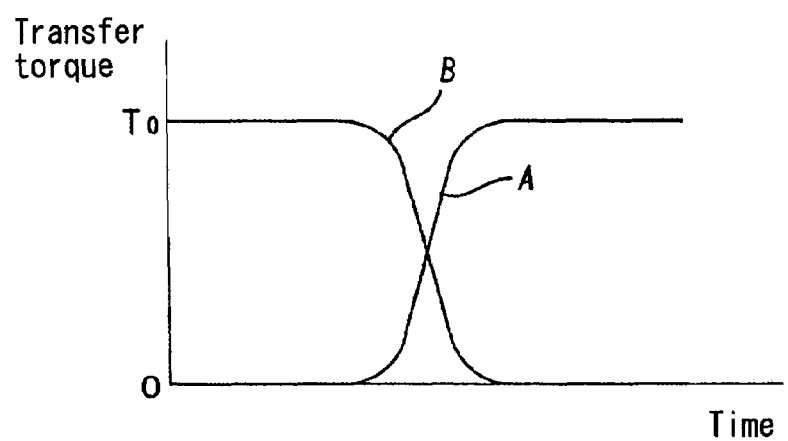
FIG. 5 is a graph explaining an operation of a dual clutch mechanism used in the dual clutch transmission.

An embodiment of the present invention will be explained with reference to FIGS. 1 to 7. The present embodiment applies to a dual clutch transmission for seven forward stages and one reverse stage. As illustrated in FIG. 1, the dual clutch transmission includes a first input shaft 13 and a second input shaft 14 that has a cylindrical shape and is rotatably provided so as to coaxially surround the first input shaft 13. The dual clutch transmission further includes a first counter shaft 15 and a second counter shaft 16 both of which are arranged in parallel with the first and second input shafts 13 and 14. The first input shaft 13 and the second input shaft 14 are connected to a first frictional clutch (first clutch) C1 and a second frictional clutch (second clutch) C2 of a dual clutch 12, respectively. The dual clutch 12 is driven to rotate by a power source such as an engine 10 by means of a drive shaft 11 to thereby cause the first and second input shafts 13 and 14 to rotate. The first and second frictional clutches C1 and C2 of the dual clutch 12 are controlled by a control unit (not shown) of the dual clutch transmission so that, as illustrated in FIG. 5, the first and second frictional clutches C1 and C2 as in a normal operating state are each brought to a half-engaged state in a middle of a shift operation where a transfer torque A of the frictional clutch C1 increases, a transfer torque B of the frictional clutch C2 decreases in contrast with the transfer torque A, and vice versa. After the completion of the shift operation, one of the frictional clutches, i.e., the frictional clutch C1, for example, is brought to a completely engaged state where the transfer torque A reaches a predetermined maximum torque value T0 while the other one of the frictional clutches, i.e., the frictional clutch C2, for example, is brought to a completely disengaged state where the transfer torque B falls down to zero.

Figure 2:
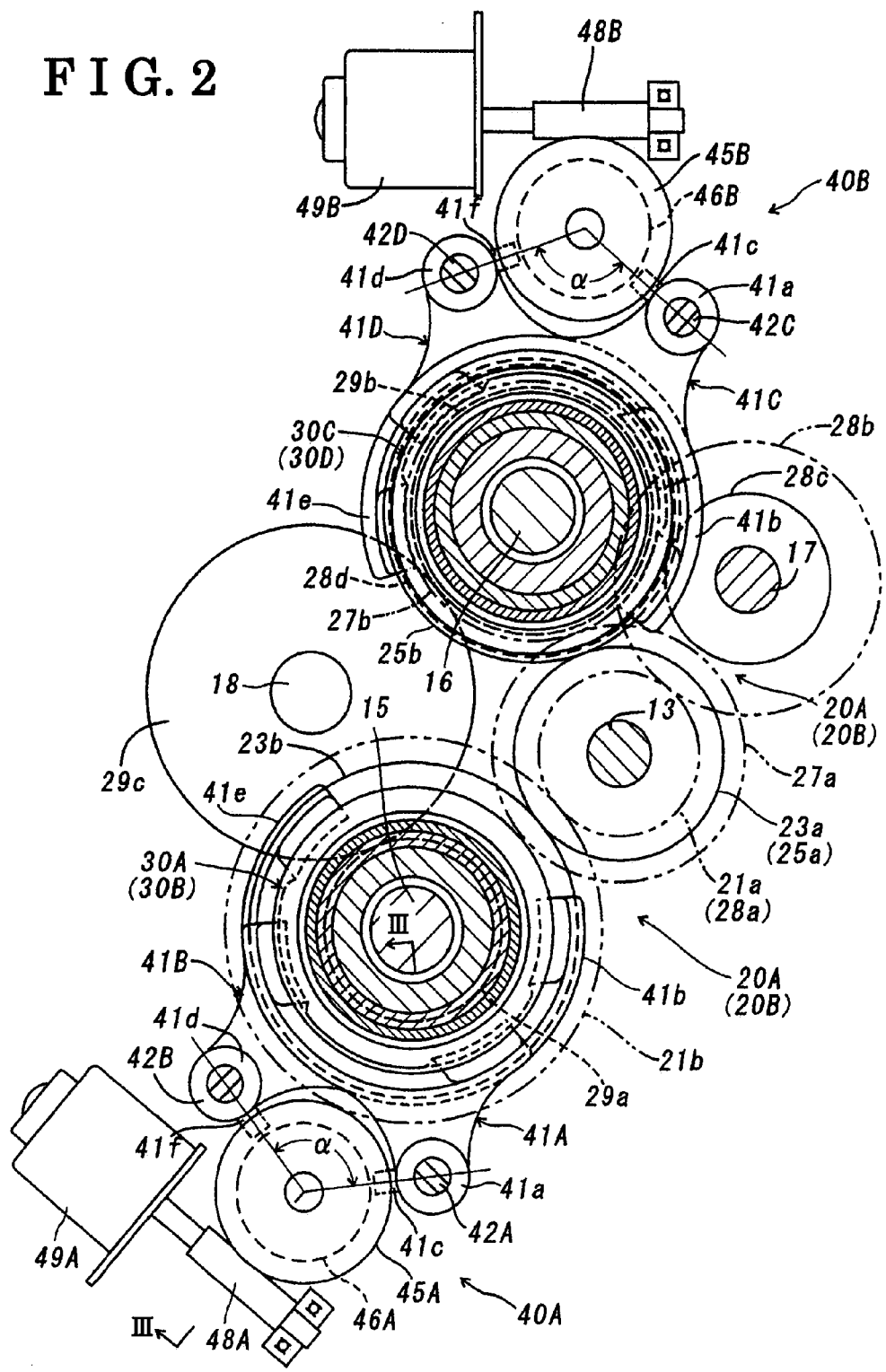
FIG. 2 is a cross-sectional view taken along the line II-II in FIG. 1.

As illustrated in FIGS. 1 and 2, a first gear change mechanism 20A, arranged between the first input shaft 13 and the first counter shaft 15, includes a first speed gear train constituted by a first drive gear 21a and a first driven gear 21b, a third speed gear train constituted by a third drive gear 23a and a third driven gear 23b, and a first switching clutch 30A. A second gear change mechanism 20B arranged between the second input shaft 14 and the first counter shaft 15 includes a second speed gear train constituted by a second drive gear 22a and a second driven gear 22b, a fourth speed gear train constituted by a fourth drive gear 24a and a fourth driven gear 24b, and a second switching clutch 30B. A third gear change mechanism 20C arranged between the first input shaft 13 and the second counter shaft 16 includes a fifth speed gear train constituted by a fifth drive gear 25a and a fifth driven gear 25b, a seventh speed gear train constituted by a seventh drive gear 27a and a seventh driven gear 27b, and a third switching clutch 30C. A fourth gear change mechanism 20D arranged between the first and second input shafts 13 and 14, and the second counter shaft 16 includes a sixth speed gear train constituted by a sixth drive gear 26a and a sixth driven gear 26b, a reverse gear shaft 17, two reverse gear trains constituted by a reverse drive gear 28a and a reverse driven gear 28b, and a reverse drive gear 28c and a reverse driven gear 28d, respectively, and a fourth switching clutch 30D. Accordingly, a gear change mechanism 20 for seven forward stages and one reverse stage is constituted by the aforementioned first to fourth gear change mechanisms 20A to 20D.

Figure 3:
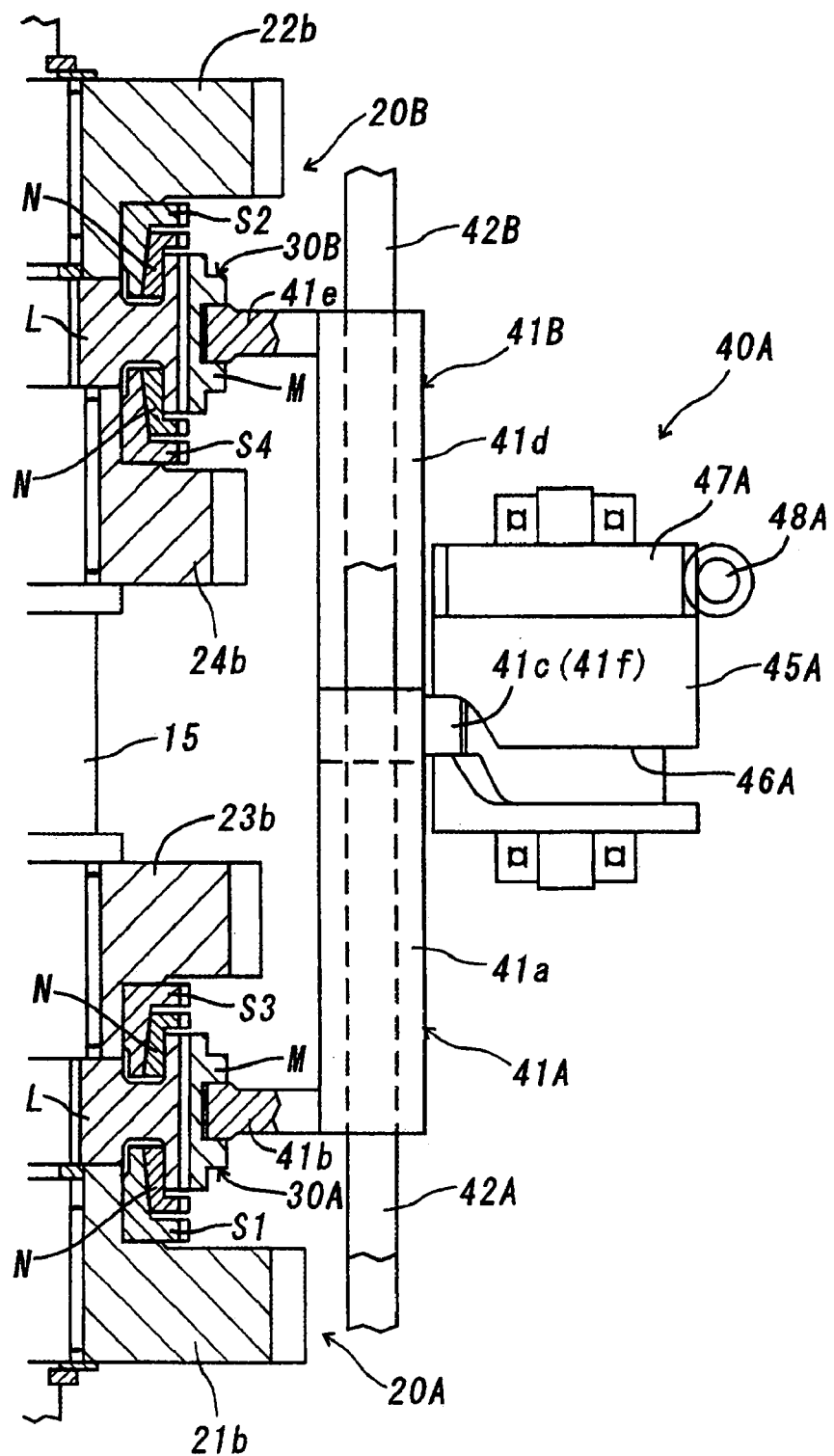
FIG. 3 is a cross-sectional view taken along the line III-III in FIG. 2.

As illustrated in FIGS. 1 and 3, the first switching clutch 30A of the first gear change mechanism 20A includes a clutch hub L fixed to the first counter shaft 15 through a spline fitting, a first engagement member S1 press fitted to the first driven gear 21b, a third engagement member S3 press fitted to the third driven gear 23b, two synchronizer rings N disposed between the clutch hub L, and the first and third engagement members S1 and S3, respectively, and a sleeve (switching member) M in spline engagement with an outer circumference of the clutch hub L so as to be axially movable relative thereto. Accordingly, a known synchromesh mechanism is achieved so that the driven gears 21b and 23b are alternately driven to engage with the first counter shaft 15. The sleeve M of the first switching clutch 30A engages with neither the engagement members S1 nor S3 as in a neutral position illustrated in FIG. 3. When the sleeve M is shifted towards the first driven gear 21b by a shift fork 41b that engages with an annular groove formed at an outer circumference of the sleeve M, the sleeve M engages through a spline fitting with the synchronizer ring N provided between the clutch hub L and the first engagement member S1 so that the rotations between the first counter shaft 15 and the first driven gear 21b are synchronized with each other. Then, the sleeve M engages with an outer spline provided at an outer circumference of the first engagement member S1 so that the first counter shaft 15 and the first driven gear 21b are integrally connected to each other, thereby achieving a first speed stage. When the sleeve M is shifted towards the third driven gear 23b by the shift fork 41b, the sleeve M brings the rotations of the first counter shaft 15 and the third driven gear 23b to be synchronized with each other so that the first counter shaft 15 and the third driven gear 23b are integrally connected to each other, thereby achieving a third speed stage.

The second to fourth gear change mechanisms 20B, 20C, and 20D each have substantially the same structure as that of the first gear change mechanism 20A but only differ in an installed position in the transmission. The second gear change mechanism 20B achieves a second speed stage and a fourth speed stage by selectively connecting the second driven gear 22b and the fourth driven gear 24b to the first counter shaft 15. The third gear change mechanism 20C achieves a fifth speed stage and a seventh speed stage by selectively connecting the fifth driven gear 25b and the seventh driven gear 27b to the second counter shaft 16. The fourth gear change mechanism 20D achieves a sixth speed stage and a reverse stage by selectively connecting the sixth driven gear 26b and the reverse driven gear 28d to the second counter shaft 16. As illustrated in FIG. 1, a pair of output shafts, i.e., 18a and 18b, connected to each other by means of a differential mechanism 19 are arranged in parallel with the first and second counter shafts 15 and 16. A large reduction gear 29c provided at the differential mechanism 19 engages with small reduction gears 29a and 29b provided at the counter shafts 15 and 16, respectively.

As illustrated in FIGS. 2 and 3, a first shift mechanism 40A, which constitutes a portion of a shifting device for a dual clutch transmission according to the present embodiment, for operating the first and second gear change mechanisms 20A and 20B includes a first shifter 41A for activating the first switching clutch 30A of the first gear change mechanism 20A, a second shifter 41B for activating the second switching clutch 30B of the second gear change mechanism 20B, and a cylindrical cam (cam member) 45A for activating the first and second shifters 41A and 41B. The first shifter 41A includes a body portion 41a having a cylindrical shape, the shift fork 41b having a forked shape, and a follower pin 41c having a small column shape. The body portion 41a is axially slidably guided and supported by a first guide bar 42A that is arranged in parallel with the first counter shaft 15. The shift fork 41b extends from one end portion of the body portion 41a in a radial direction so as to be integrally formed with the body portion 41a and engages with the annular groove formed at the outer circumference of the sleeve M. The follower pin 41c extends from the other end portion of the body portion 41a in a radial direction that is opposite to a direction where the shift fork 41b extends so as to be integrally formed with the body portion 41a. The second shifter 41B has a substantially same structure as that of the first shifter 41A but reversely arranged relative thereto. That is, the second shifter 41B includes a cylindrical-shaped body portion 41d axially slidably guided and supported by a second guide bar 42B that is arranged in parallel with the first guide bar 42A, a shift fork 41e engaging with the annular groove formed at the outer circumference of the sleeve M of the second switching clutch 30B, and a follower pin 41f arranged axially adjacent to the follower pin 41c.

The cylindrical cam 45A is supported so as to be rotatable about an axis in parallel with the guide bars 42A and 42B. The cylindrical cam 45A is driven to rotate by a shift motor 49A via a worm wheel 47A fixed to one end surface of the cylindrical cam 45A and a worm 48A engages with the worm wheel 47A. The follower pins 41c and 41f of the shifters 41A and 41B, respectively, engage with an annular-shaped cam groove 46A formed along an outer peripheral surface of the cylindrical cam 45A in such a way that the follower pins 41c and 41f are arranged in different angular positions from each other in a circumferential direction.

Figure 6:
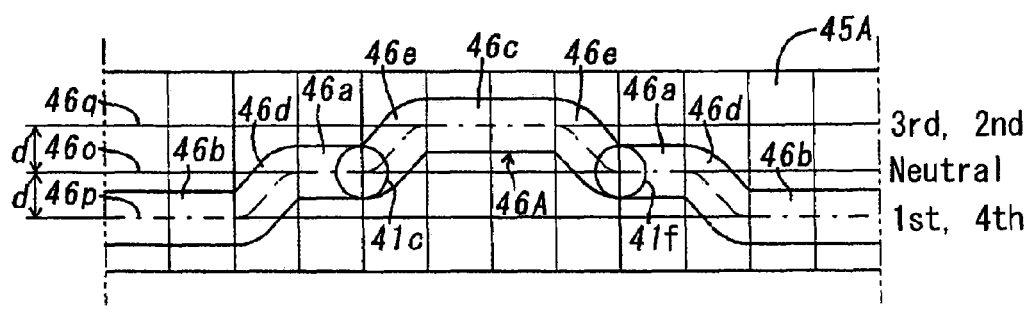
FIG. 6 is a development view of an outer peripheral surface of a cylindrical cam used in the shifting device according to the present embodiment.

According to the present embodiment, as illustrated in a development view of FIG. 6, the outer peripheral surface of the cylindrical cam 45A is divided into twelve areas each having the same pitch in a circumferential direction and each corresponding to a 30 degree angle. The annular cam groove 46A is constituted by a pair of neutral grooves 46a, first and second shift grooves 46b and 46c arranged in axially opposite directions to each other relative to the neutral grooves 46a, a pair of first inclined grooves 46d, and a pair of second inclined grooves 46e. The pair of first inclined grooves 46d and the pair of second inclined grooves 46e each connect the neutral groove 46a and the shift groove 46b or 46c to each other.

The neutral grooves 46a are formed on a neutral line 46o that is perpendicular to a rotational axis of the cylindrical cam 45A and that extends in the circumferential direction of the outer peripheral surface thereof. In addition, the neutral grooves 46a have intervals therebetween in the circumferential direction. Specifically, one of the intervals between the neutral grooves 46a in the circumferential direction has 6-pitch length while the other one of the intervals has 4-pitch length. Each neutral groove 46a has 1-pitch length in the circumferential direction. The first shift groove 46b has 4-pitch length in the circumferential direction and is formed on a first shift line 46p that is away from the neutral line 46o by a predetermined distance d in axially one direction (i.e., lower direction in FIG. 6) of the rotational axis of the cylindrical cam 45A. The first shift groove 46b is arranged in a middle of the portion where the interval between the neutral grooves 46a is the 6-pitch length. The first shift groove 46b forms 1-pitch length interval in the circumferential direction with each neutral groove 46a. The second shift groove 46c has 2-pitch length in the circumferential direction and is formed on a second shift line 46q that is away from the neutral line 46o by the predetermined distance d in the opposite direction to the first shift line 46p (i.e., upper direction in FIG. 6). The second shift groove 46c is arranged in a middle of the portion where the interval between the neutral grooves 46a is the 4-pitch length. The second shift groove 46c forms 1-pitch length interval in the circumferential direction with each neutral groove 46a. The first inclined grooves 46d link both end portions of the first shift groove 46b and respective facing end portions of the neutral grooves 46a. The second inclined grooves 46e link both end portions of the second shift groove 46c and respective facing end portions of the neutral grooves 46a. The follower pins 41c and 41f of the first and second shifters 41A and 41B, respectively, are arranged in angular positions away from each other by approximately 120 degree angle, which is shown by α in FIG. 2, in the circumferential direction on the outer peripheral surface of the cylindrical cam 45A and engage with the cam groove 46A. Each link portion between the inclined groove 46d or 46e and the neutral groove 46a may have a curved surface.

Figure 11:
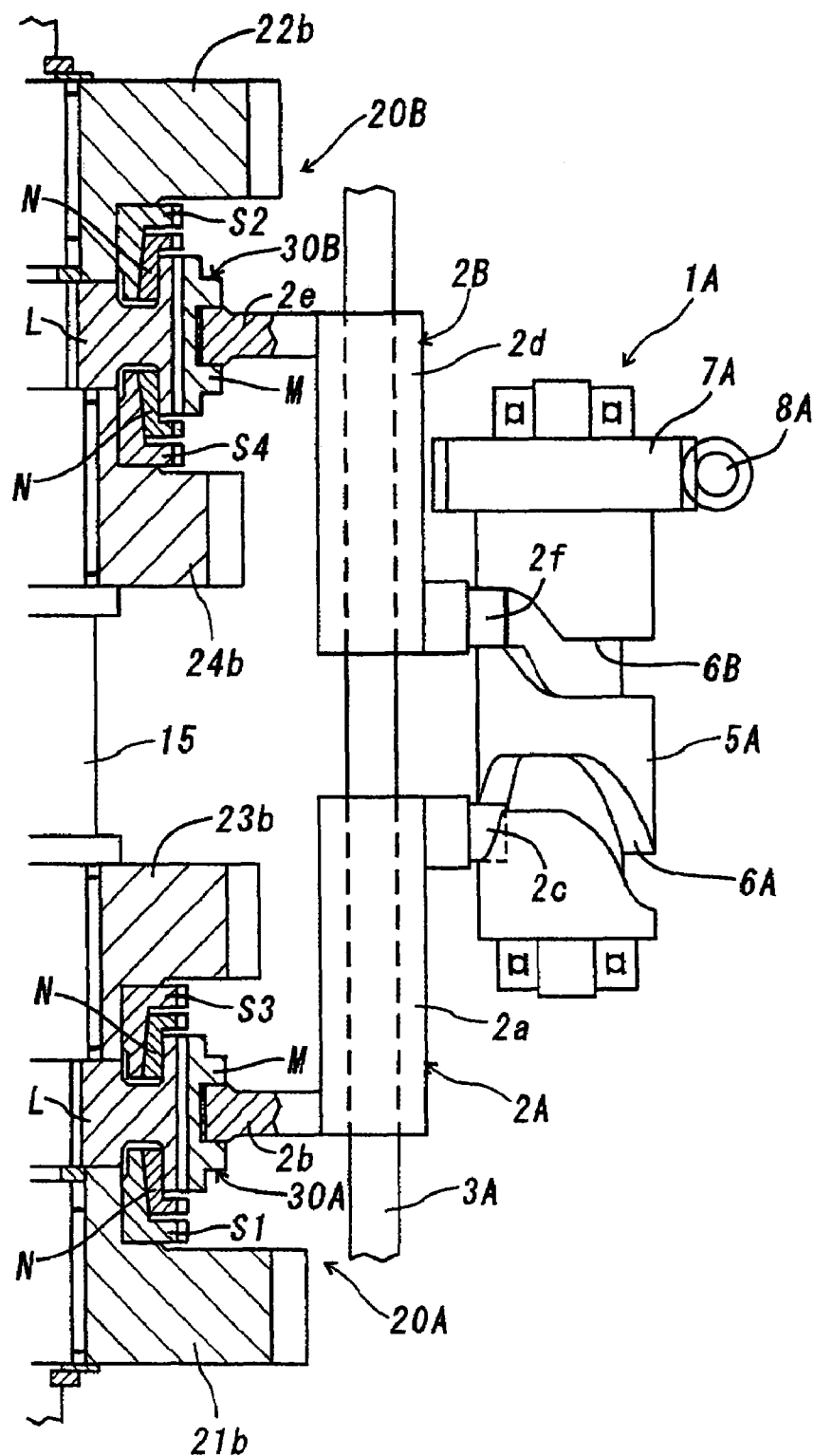
FIG. 11 is a cross-sectional view of the conventional shifting device for a dual clutch transmission.

A cam groove 46B formed at a second shift mechanism 40B that constitutes a portion of the shifting device for a dual clutch transmission according to the present embodiment and that operates the third and fourth gear change mechanisms 20C and 20D has substantially the same structure as that of the cam groove 46A but has an upside down shape relative thereto because of the different arrangement of the gear trains of the gear change mechanisms 20C and 20D. According to the present embodiment, two guide bars 42A and 42B and also two guide bars 42C and 42D are provided at the shift mechanisms 40A and 40B, respectively, so that the shifters 41A, 41B, 41C, and 41D are guided and supported by the respective guide bars 42A, 42B, 42C, and 42C. Alternatively, only one guide bar can be provided at each of the shift mechanisms 40A and 40B so that each guide bar can be configured to guide and support two shifters. In this case, a length of the body portion of each shifter can be as substantially short as that of the body portions 2a and 2d of shifters 2A and 2B according to the conventional shifting device as illustrated in FIG. 11. In addition, each follower pin that engages with the cam groove can be formed at an end portion of an arm externally extending from the body portion of each shifter.

The control unit of the dual clutch transmission alternately brings the first and second frictional clutches C1 and C2 of the dual clutch 12 to an engagement state and a disengagement state depending on an operating state of a vehicle such as a vehicle speed. At the same time, the control unit brings the first to fourth switching clutches 30A to 30D to be axially shifted by means of the shift mechanisms 40A and 40B so as to select the gear change mechanism 20 constituted by the first to fourth gear change mechanisms 20A to 20D. In this case, in a range of the first speed stage to the fourth speed stage, only the first and second gear change mechanisms 20A and 20B are operated by the first shift mechanism 40A while in a range of the fifth speed stage to the seventh speed stage and the reverse stage, only the third and fourth gear change mechanisms 20C and 20D are operated by the second shift mechanism 40B.

Figure 7:
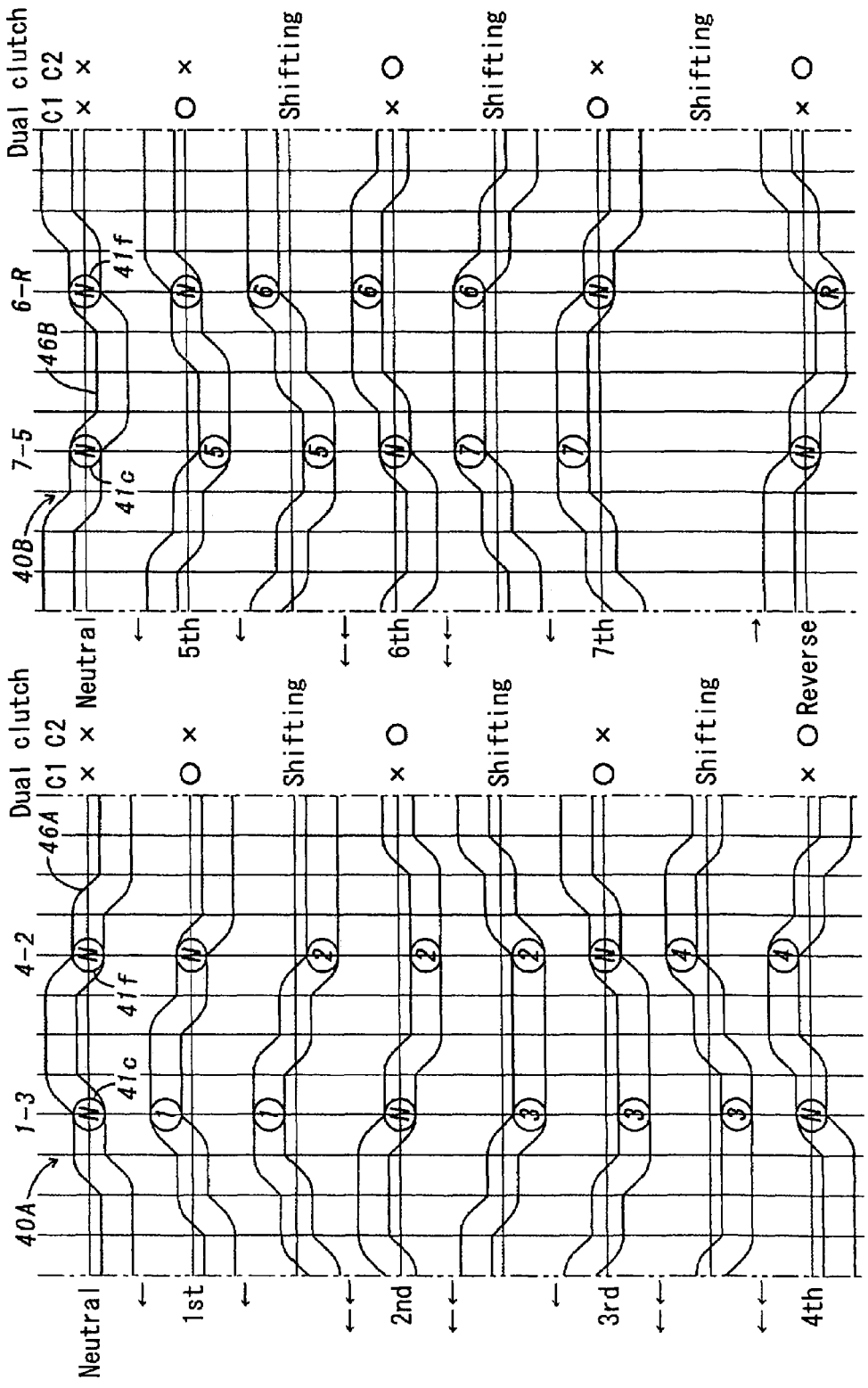
FIG. 7 is a view explaining an operation of the shifting device according to the embodiment of the present invention.

Next, the operation of the gear change mechanism will be explained with reference to FIGS. 4 and 7. When a vehicle is in a non-operative state, the first and second frictional clutches C1 and C2 are both brought to the disengagement state where the cylindrical cams 45A and 45B are arranged in such a way that the follower pins 41c and 41f are positioned in respective end portions of the neutral grooves 46a of the cam grooves 46A and 46B (see upper views in FIG. 7, illustrated as "Neutral") so as to be away from each other by 4 pitches. At this time, the first to fourth switching clutches 30A to 30D are all in neutral positions. When the engine 10 is started from a vehicle stop state and a shift lever (not shown) is brought to a forward drive position, the control unit controls the cylindrical cam 45A of the first shift mechanism 40A to rotate so that the cam groove 46A is shifted in a leftward direction by one pitch from the neutral position as illustrated as "1st" in FIG. 7. Accordingly, the follower pin 41c of the first shift mechanism 40A is shifted to the first speed position, and the sleeve M of the first switching clutch 30A is shifted by the predetermined distance d towards the first driven gear 21b so as to engage with the first engagement member S1 of the first switching clutch 30A, which achieves the first speed stage. When an acceleration opening increases and then a speed of the engine 10 exceeds a predetermined level, the control unit brings the first frictional clutch C1 of the dual clutch 12 to the engagement state so that a drive torque of the drive shaft 11 is transmitted from the first frictional clutch C1 to the output shafts 18a and 18b via the first input shaft 13, the first speed gear train 21a and 21b, the first switching clutch 30A, the first counter shaft 15, a reduction gear train 29a and 29c, and the differential mechanism 19.

When it is assumed that the operating state of the vehicle is suitable for the second speed running based on the increase of the acceleration opening, and the like, the control unit first controls the cam groove 46A to be shifted in the leftward direction from the first speed position by one pitch so that the follower pin 41f of the second shifter 41B is shifted to the second speed position. At this time, the follower pin 41f moves the second gear change mechanism 20B provided between the first counter shaft 15 and the second input shaft 14 that is connected to the second frictional clutch C2 in the disengagement state and thus that does not perform a power transmission. The control unit controls the dual clutch 12 so that the first frictional clutch C1 is brought to the disengagement state while the second frictional clutch C2 is brought to the engagement state, and then controls the cam groove 46A to be shifted in the leftward direction by further two pitches, thereby moving the follower pin 41c of the first shifter 41A to the neutral position. At this time, the follower pin 41c moves the first gear change mechanism 20A provided between the first input shaft 13 and the first counter shaft 15 that is connected to the first frictional clutch C1 in the disengagement state and thus that does not perform a power transmission. Accordingly, as illustrated as "2nd" in FIG. 4, the second speed stage is achieved by the engagement of the sleeve M with a second engagement member S2 of the second switching clutch 30B while the second frictional clutch C2 is in the engagement state.

In the same way, the control unit controls the cam groove 46A to be shifted in the leftward direction by two pitches from the second speed position when it is assumed that the operating state of the vehicle is suitable for the third speed running, thereby moving the follower pin 41c of the first shifter 41A to the third speed position. The control unit controls the dual clutch 12 in such a way that the first frictional clutch C1 is brought to the engagement state while the second frictional clutch C2 is brought to the disengagement state. Then, the control unit controls the cam groove 46A to be shifted in the leftward direction by further one pitch to achieve the third speed running. The shifting to the fourth speed running is performed in the same way.

When it is assumed that the operating state of the vehicle is suitable for the fifth speed running, the control unit first controls the second shift mechanism 40B so that the cylindrical cam 45B rotates. Then, the control unit controls the cam groove 46B to be shifted in the leftward direction by one pitch from the neutral position so that the follower pin 41c of the third shifter 41C, which is provided to operate the third gear change mechanism 20C, is shifted to the fifth speed position. Next, the control unit controls the dual clutch 12 in such a way that the first frictional clutch C1 is brought to the engagement state while the second frictional clutch C2 is brought to the disengagement state, and then controls the first shift mechanism 40A so that the cam groove 46A is driven to move in the leftward direction by one pitch from the fourth speed position. The both follower pins 41c and 41f of the first shift mechanism 40A are brought to the neutral position accordingly. As a result, as illustrated as "5th" in FIG. 4, while the first and second switching clutches 30A, and 30B, i.e., precisely, the first and second gear change mechanisms 20A and 20B, are in the neutral position, the sleeve M engages with a fifth engagement member S5 of the third switching clutch 30C to thereby achieve the fifth speed stage. At this time, the dual clutch 12 is controlled in such a way that the first frictional clutch C1 is brought to the engagement state while the second frictional clutch C2 is brought to the disengagement state.

In the same way, when it is assumed that the operating state of the vehicle is suitable for the sixth speed running, the control unit controls the cam groove 46B to be shifted in the leftward direction by two pitches from the fifth speed position so that the follower pin 41f of the fourth shifter 41D is shifted to the sixth speed position. After the control unit controls the dual clutch 12 so that the first frictional clutch C1 is brought to the disengagement state while the second frictional clutch C2 is brought to the engagement state, the control unit controls the cam groove 46B to be shifted in the leftward direction by further two pitches so as to be changed to the sixth speed running state. The change to the seventh speed running is performed in the same way. Further, when it is assumed that the operating state of the vehicle is suitable for the lower speed stage running because of the decrease of the vehicle speed from a certain running state, the control unit controls the shift mechanisms 40A and 40B to sequentially select the lower speed stage depending on the operating state of the vehicle while alternately bringing the first frictional clutch C1 and the second frictional clutch C2 to the engagement or disengagement state so as to achieve the vehicle running under the certain speed stage suitable for the condition at that time.

In the case where the shift lever of the transmission is shifted to the reverse position from the vehicle stopped state with the engine 10 started, the control unit detects that state and controls the cylindrical cam 45B of the second shift mechanism 40B to rotate so that the cam groove 46B is shifted in the rightward direction by one pitch from the neutral position as illustrated as "Reverse" in FIG. 7. Accordingly, the follower pin 41f of the second shift mechanism 40B is shifted to the reverse position so that the sleeve M of the fourth switching clutch 30D is shifted towards the reverse driven gear 28d to engage with a reverse engagement member SR, thereby achieving the reverse stage. When the acceleration opening increases and then the speed of the engine 10 exceeds the predetermined level, the control unit brings the first frictional clutch C1 of the dual clutch 12 to the engagement state so that the vehicle moves in a rearward direction.

According to the aforementioned embodiment, as is clearly understood from FIG. 7, the follower pin 41c of the shifter 41A and the follower pin 41f of the shifter 41B, or the follower pin 41c of the shifter 41C and the follower pin 41f of the shifter 41D are prevented from being positioned in the neutral positions at the same time in a range of first to seventh speed stages and rear stage. Thus, the power transmission by the respective gear change mechanisms 20A to 20D is prevented from being interfered during the gear shift operation, which can accomplish the shifting device suitable for the dual clutch transmission.

Further, according to the aforementioned embodiment, respective pairs of follower pins 41c and 41f of the first and second shift mechanisms 40A and 40B engage with different positions on the cam grooves 46A and 46B that are formed at the cylindrical cams 45A and 45B, respectively. Then, each of the first to fourth switching clutches 30A to 30D is driven to move so that the first to fourth gear change mechanisms 20A to 20D operate with each other, thereby achieving a reduced length of the cylindrical cams 45A and 45B as compared to a cam having multiple cam grooves. As a result, the downsized and light-weighted dual clutch transmission can be obtained.

Furthermore, according to the aforementioned embodiment, the switching clutch 30A, 30B, 30C or 30D of the gear change mechanism 20A, 20B, 20C, or 20D that is connected to the frictional clutch C1 or C2 in the disengagement state and thus that does not perform the power transmission is selected and shifted. Accordingly, a force required to move the clutch may be small, which can achieve easy and reasonable movement of the clutch.

Furthermore, according to the aforementioned embodiment, the cylindrical cams 45A and 45B of which outer peripheral surfaces are formed with the cam grooves 46A and 46B, respectively, are arranged in parallel with the counter shafts 15 and 16. Thus, the cylindrical cams 45A and 45B, and the cam grooves 46A and 46B can be simply constituted to thereby simplify the shifting device for the dual clutch transmission. However, the cam member can form into other shapes such as a plate shape or a conical shape.

Figure 8:
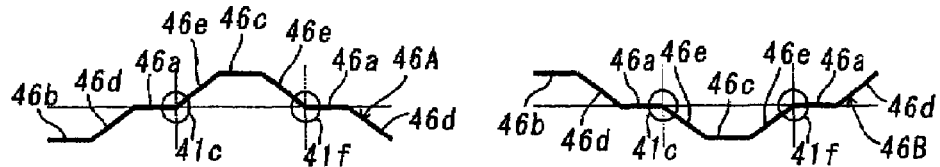
FIG. 8 is a development view of a cam groove according to a variation of the present invention.
Figure 9:
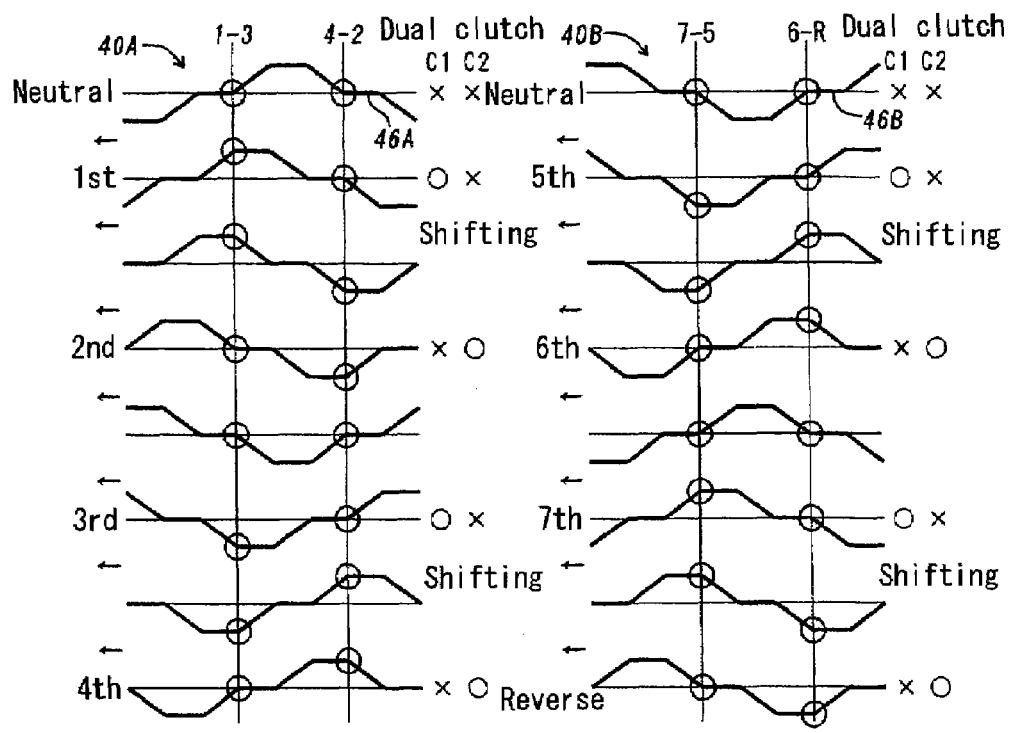
FIG. 9 is a view explaining an operation of a shifting device according to the variation of the present invention.
Figure 10:
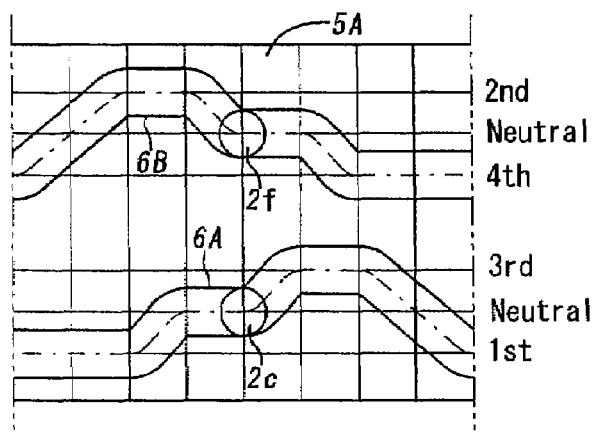
FIG. 10 is a development view of an outer peripheral surface of a cylindrical cam according to a conventional shifting device for a dual clutch transmission.

Furthermore, according to the aforementioned embodiment, the respective outer peripheral surfaces of the cylindrical cams 45A and 45B are each divided into twelve areas each having the same pitch in the circumferential direction and corresponding to the thirty degree angle. The cam grooves 46A and 46B each includes the pair of neutral grooves 46a, the first and second shift grooves 46b and 46c, the pair of first inclined grooves 46d, and the pair of second inclined grooves 46e. Then, the first shift groove 46b has the 4-pitch length in the circumferential direction while the second shift groove 46c has the 2-pitch length. The pair of neutral grooves 46a, the first inclined grooves 46d and the second inclined grooves 46e each have the 1-pitch length. However, the present embodiment is not limited to the above and can be varied. FIGS. 8 and 9 illustrate one of variations of the shifting device for the dual clutch transmission. Each of the outer peripheral surfaces of the cylindrical cams 45A and 45B can be divided into eight areas in the circumferential direction each corresponding to a forty-five degree angle. The pair of neutral grooves 46a, the first and second shift grooves 46b and 46c, the pair of first inclined grooves 46d, and the pair of second inclined grooves 46e each have 1-pitch length in the circumferential direction. According to this variation, the cylindrical cams 45A and 45B are operated in such a way that one movement of each of the cam grooves 46A and 46B corresponds to 1-pitch length. The operation of this variation is substantially the same as that of the aforementioned embodiment but is different only in a point where the follower pins 41c and 41f of the first to fourth shifters 41A to 41D are in the neutral positions at the time of gear shifting from the second speed to the third speed, and that from the sixth speed to the seventh speed, as illustrated in FIG. 9.

According to the present variation, since the power transmission by the dual clutch transmission is cut off at the time of gear shifting from the second speed to the third speed, and that from the sixth speed to the seventh speed, the acceleration of the vehicle may be temporarily interrupted and the engine speed may increase. However, immediately after the cut off of the power transmission, the first or second frictional clutch C1 or C2 is brought to the engagement state so that the acceleration is restored and the engine speed is returned to the normal condition. Therefore, a driver may have an unpleasant feeling when driving but the functionality still remains.

The length of the first shift groove 46b and the second shift groove 46c of each of the cam grooves 46A and 46B can be different from that of the aforementioned embodiment or variation. Further, only one counter shaft can be provided in the dual clutch transmission. In both cases, the same advantage can be obtained.

According to the aforementioned embodiment and variation, respective follower pins of the first and second shifters engage with different positions on the cam groove formed at the cylindrical cam. Then, each of the switching clutches is driven to move so that the gear change mechanisms can operate with each other, thereby achieving a reduced length of the cylindrical cam as compared to a cam having multiple cam grooves. As a result, the downsized and light-weighted dual clutch transmission can be obtained.

Further, according to the aforementioned embodiment and variation, the switching clutch of the gear change mechanism that is connected to the frictional clutch in the disengagement state and thus that does not perform the power transmission is selected and shifted. Accordingly, a force required to move the clutch may be small, which can achieve easy and reasonable movement of the clutch.

Furthermore, according to the aforementioned embodiment and variation, the cylindrical cam and the cam groove can be simply constituted to thereby simplify the shifting device for the dual clutch transmission.

Furthermore, according to the aforementioned embodiment and variation, the respective switching clutches can be shifted by the predetermined distance in axially both directions so that the gear change mechanisms can operate with one another.

Further, the length of the first and second shift grooves can be appropriately selected so that the respective switching clutches can have different transport properties from one another.

Furthermore, the power transmission by the dual clutch transmission is never cut off during the operation of the shifting device for the dual clutch transmission, which can achieve the appropriate and suitable shifting device for the dual clutch transmission having the dual clutch mechanism.

Furthermore, one movement of the cylindrical cam can be equalized, i.e., the equal angle, to thereby achieve an easy control of the shifting device.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A shifting device for a dual clutch transmission, the dual clutch transmission including a first input shaft, a second input shaft, and a counter shaft arranged in parallel with one another, a dual clutch including a first clutch for transmitting rotation of a drive shaft that is driven to rotate by a power source to the first input shaft and a second clutch for transmitting rotation of the drive shaft to the second input shaft, a first gear change mechanism including at least a first gear train provided between the first input shaft and the counter shaft and a first switching clutch for selecting a power transmission performed by the first gear train, and a second gear change mechanism including at least a second gear train provided between the second input shaft and the counter shaft and a second switching clutch for selecting a power transmission performed by the second gear train, the shifting device comprising:
a shift mechanism operating the first and second switching clutches and including a first shifter that includes a first follower pin and a first shift fork engaging with a switching member provided at the first switching clutch, the first shifter being slidably arranged in parallel with the first input shaft and the counter shaft;
the shift mechanism including a second shifter that includes a second follower pin and a second shift fork engaging with a switching member provided at the second switching clutch, the second shifter being slidably arranged in parallel with the second input shaft and the counter shaft;
the shift mechanism including a cam member driven by a motor to rotate and at which a single cam groove is formed, the cam groove passing through a position away from a rotational center of the cam member; and
the first and second follower pins engaging with different positions on the cam groove from each other and operating the first and second switching clutches to be associated with each other.

2. A shifting device for a dual clutch transmission according to claim 1, wherein one of the first and second clutches of the dual clutch is controlled to be in a disengagement state while the other one of the first and second clutches is controlled to be in an engagement state, and the shift mechanism is controlled to select and operate one of the first and second switching clutches that performs a power transmission between one of the first and second input shafts connected to the clutch in the disengagement state and the counter shaft.

3. A shifting device for a dual clutch transmission according to claim 2, wherein the cam member is constituted by a cylindrical cam arranged so as to be rotatable in parallel with the first and second input shafts and the counter shaft, and the cam groove is formed along a circumferential direction of an outer peripheral surface of the cylindrical cam.

4. A shifting device for a dual clutch transmission according to claim 3, wherein the outer peripheral surface of the cylindrical cam is divided into plural areas each having the same pitch length in the circumferential direction, and the cam groove includes a pair of neutral grooves each formed on a neutral line that is perpendicular to a rotational axis of the cylindrical cam and is extending in the circumferential direction of the outer peripheral surface thereof, the pair of neutral grooves having respective intervals in the circumferential direction therebetween constituted by multiple pitches and each having one pitch length in the circumferential direction, a first shift groove formed on a first shift line that is away from the neutral line by a predetermined distance in one direction of the rotational axis, the first shift groove being arranged in a middle of one of the intervals formed between the pair of neutral grooves and forming one pitch length distance with respective neutral grooves in the circumferential direction, a second shift groove formed on a second shift line that is away from the neutral line by the predetermined distance in a direction opposite to the first shift line, the second shift groove being arranged in a middle of the other one of the intervals formed between the pair of neutral grooves and forming one pitch length distance with respective neutral grooves in the circumferential direction, a pair of first inclined grooves linking both end portions of the first shift groove and respective facing end portions of the neutral grooves, and a pair of second inclined grooves linking both end portions of the second shift groove and respective facing end portions of the neutral grooves.

5. A shifting device for a dual clutch transmission according to claim 4, wherein each length of the first shift groove and the second shift groove in the circumferential direction includes plural pitches.

6. A shifting device for a dual clutch transmission according to claim 5, wherein the length of the first shift groove in the circumferential direction includes four pitches while the length of the second shift groove in the circumferential direction includes two pitches.

7. A shifting device for a dual clutch transmission according to claim 4, wherein each length of the first shift groove and the second shift groove in the circumferential direction includes one pitch.

* * * * *